April 14, 1953     C. N. CONE     2,634,749
COOKING APPARATUS
Filed Jan. 9, 1947     3 Sheets-Sheet 1
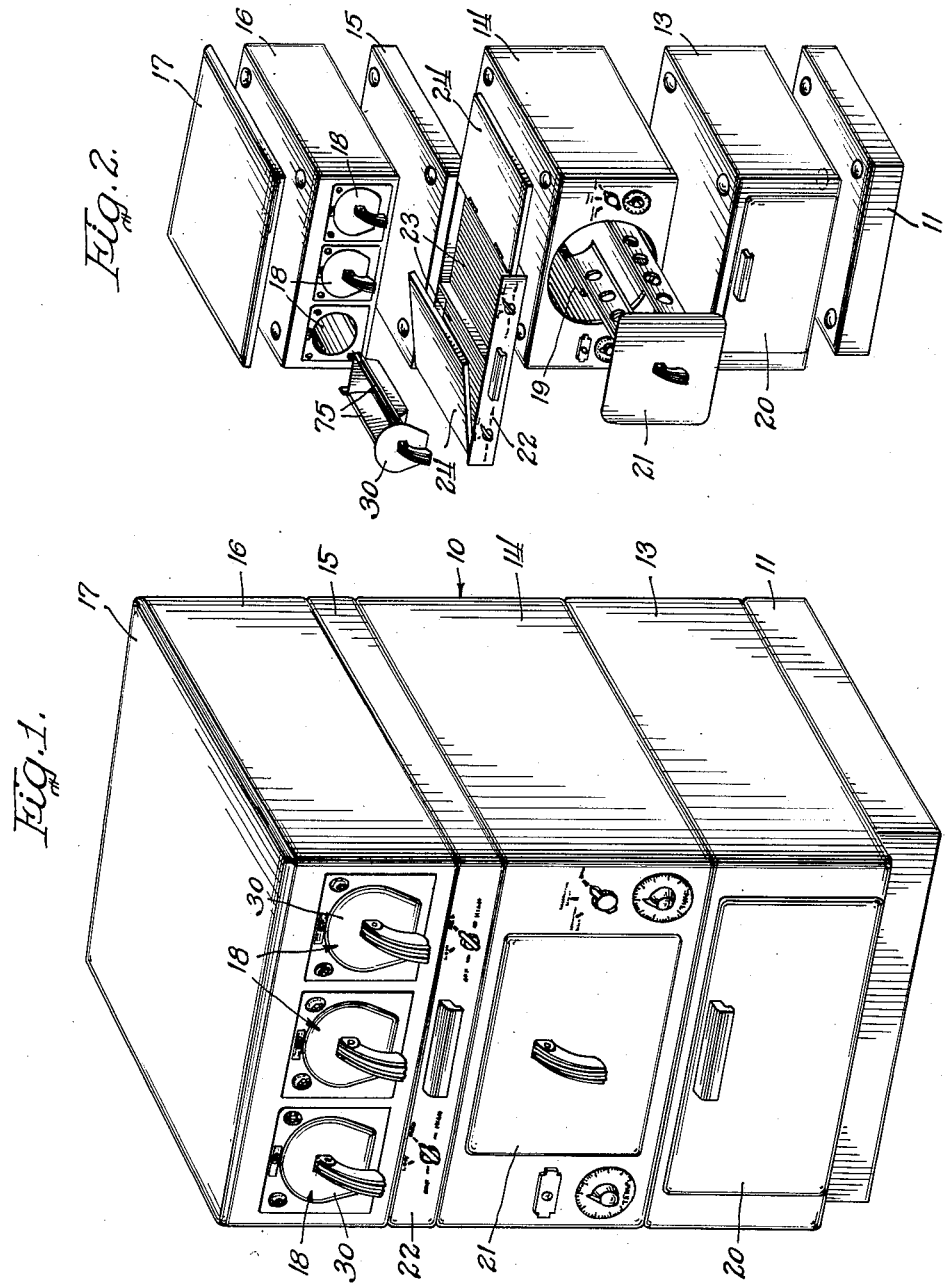
Inventor:
Clarence N. Cone
By Watson D. Harbaugh
Atty.

April 14, 1953  C. N. CONE  2,634,749
COOKING APPARATUS
Filed Jan. 9, 1947  3 Sheets-Sheet 2
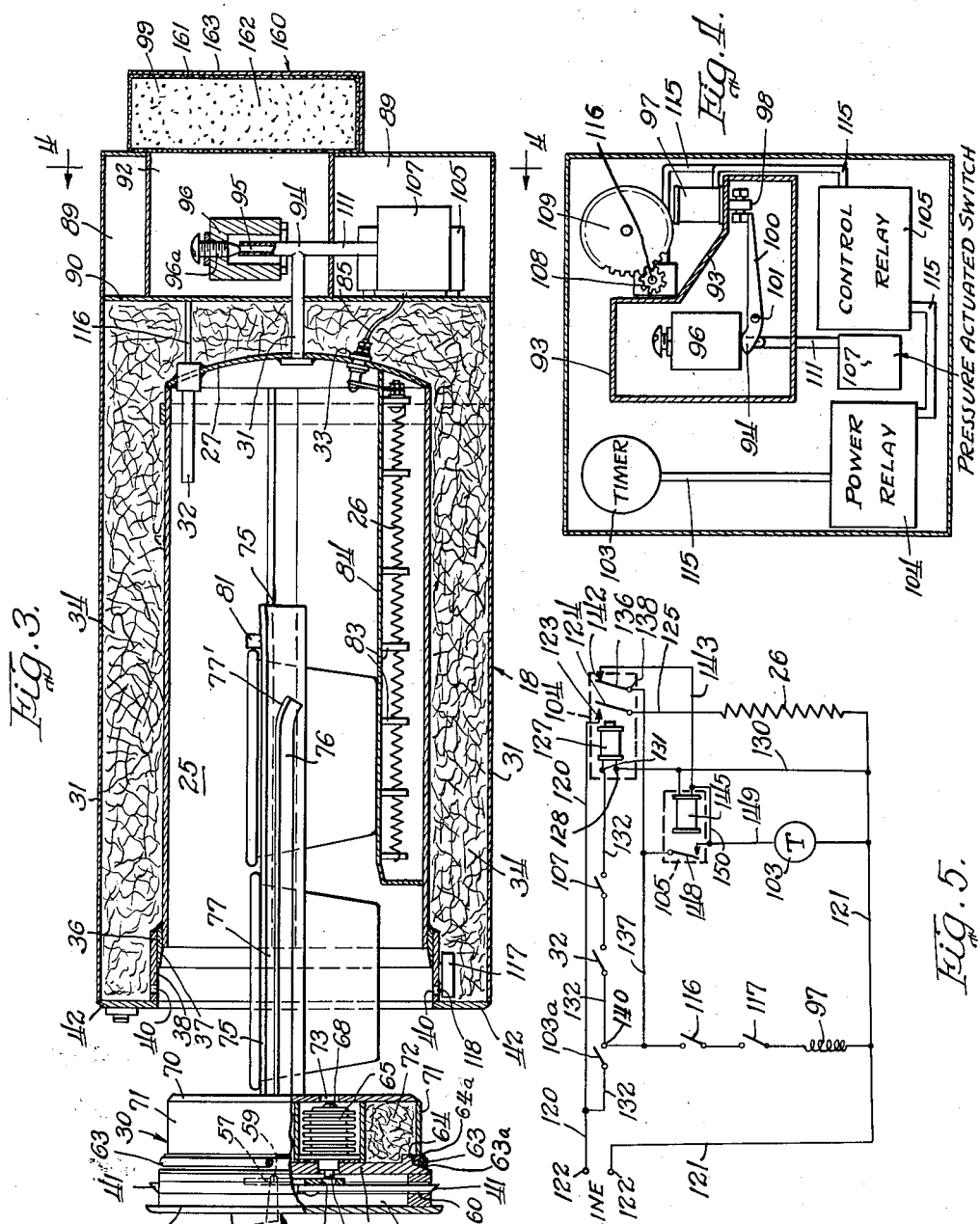
Inventor:
Clarence N. Cone
By Watson D. Harbaugh
Atty.

April 14, 1953  C. N. CONE  2,634,749
COOKING APPARATUS

Filed Jan. 9, 1947  3 Sheets-Sheet 3

Inventor:
Clarence N. Cone.
By Watson D. Harbaugh
Atty.

Patented Apr. 14, 1953

2,634,749

UNITED STATES PATENT OFFICE 2,634,749

COOKING APPARATUS

Clarence N. Cone, Haverford, Pa.

Application January 9, 1947, Serial No. 721,117

4 Claims. (Cl. 137—587)

This invention relates generally to cooking apparatus and more particularly to a novel cooking unit used in the preparation of food adaptable to pressure cooking as well as the conventional methods and which may be assembled with other related units to form a kitchen stove. The cooking unit of this invention is further characterized in that it may be used to automatically cook food in a number of different ways such as boiling, baking, roasting, frying or pressure cooking by making certain adjustments of the automatic controls provided.

One object of this invention is, therefore, to provide a cooking unit which is largely automatic in its operation and which may be employed for all the conventional means of cooking as well as for pressure cooking.

Another object is to provide an electrically heated pressure cooking unit having its heating element within the pressure tight shell in order to achieve more efficient heat transfer and better insulation against heat losses.

Another object is to provide a cooking unit which may be readily assembled with other related units to form an integral stove structure.

A further object is to provide a pressure tight cooking unit which may be employed as an oven to bake, roast, or broil food or as a pressure cooker so that foods which normally would be roasted or baked may be quickly pressure cooked and then roasted or baked to finish cook them, thereby greatly reducing the time required for cooking.

Another object is to provide an automatic control system for a pressure cooker having a conduit for removing vapors from the cooking chamber which system employs a solenoid to close a safety valve and seal off said conduit during pressure cooking operations.

Another object is to provide a cooking unit having a conduit for removing cooking vapors and steam which may be provided with an activated charcoal, silica gel, or other adsorptive material filter to remove odors and which may lead through a water bath to condense vapors.

Another object is to provide an automatic control system for a pressure cooker which employs a clock mechanism to time the cooking cycle, said mechanism being started in operation when the pressure or temperature within the cooker reaches a predetermined value and which mechanism opens a valve at the end of the cooking cycle to release the pressure as well as opens a switch to deenergize the heating element and control circuits.

A further object is to provide a pressure operated interlock in the pressure tight door of a pressure cooker which prevents the door's being opened while pressure is present in the cooking chamber.

A further object is to provide an electrical interlock which prevents the closing of the safety valve in the exhaust conduit when the door of the cooking unit is not locked in the closed position.

Additional objects and advantages of this invention will be apparent on reading the specification and the appended claims in conjunction with the drawings in which:

Fig. 1 is a perspective view of a stove assembled from various related cooking units.

Fig. 2 is an expanded view showing the manner in which the units of Fig. 1 may be disassembled.

Fig. 3 is a longitudinal section of a cooking unit.

Fig. 4 is a transverse section of the rear portion of the unit of Fig. 3.

Fig. 5 is a wiring diagram of the various control elements of a single unit.

Figure 6:
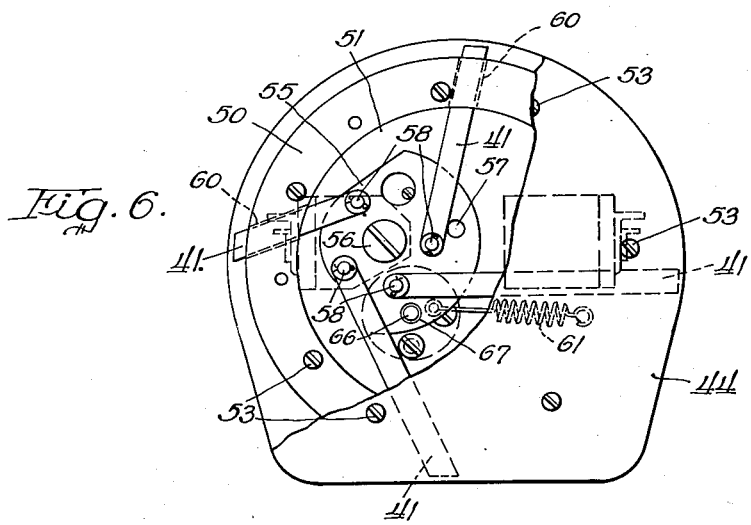
Fig. 6 is a view of a door of a single unit having a portion of the covering plate cut away to show the operating mechanism.

A kitchen stove 10 built up of various units is shown in Fig. 1. The manner in which these units may be disassembled is illustrated in Fig. 2. All the units of the stove 10 are supported by a base portion 11. It is contemplated that the base portion 11 be either adjustable in height or that various different height bases 11 could be furnished in order to adjust the height of the stove 10 to that most convenient to the chef. Superimposed on the base 11 is a storage compartment 13 provided with a door 20 which may be either hinged or form the front wall of a pull-out drawer (not shown). The oven unit 14 is supported on top of the compartment 13 and contains a cylindrical oven 19 and the various controls therefor. The fryer or grill section 15, containing a pull-out drawer 22 which carries the electrically heated grills 23, rests on top of the oven unit 14. A switch (not shown) is provided in the electrical circuit to the grill which is closed only when the grill is withdrawn so that current cannot be supplied to the heating elements unless they are in the extended position. The grills 23 are provided with two folding covers 24 which open to form a worktable area on each side of the grills 23. A section 16, above the grill section 16, contains three individual cooking units 18. This section 16 is covered by a top plate 17.

It will be readily apparent that the disposition and relationship of the various elements could be varied within the stove 10 and that additional elements could readily be added to build up any desired combination without making any great structural changes in the sections themselves. In practice, openings (not shown) are provided in the rear end of each section for the necessary electric wiring and for vent conduits (not shown).

Referring now to the individual cooking units 18, three of which are shown installed in section 16 (Fig. 1), Figs. 3 through 7 show a single unit 18 contained in a unitary housing 31. It will be apparent that any number of such units 18 could be enclosed in a single case and assembled with oven and grill units where desired to form a unitary stove structure. For the purpose of description, a single unit 18 such as could be used in a conventional kitchen to supplement a standard stove, will be described. However, it is conceivable that such a single unit 18 could be used as the only cooking means in a small apartment or home, even though no more than one method of cooking could be employed at a time.

The cooking unit 18 is contained in a sheet metal housing 31 and comprises a cylindrical cooking chamber 25 which is capable of withstanding pressure, and which is provided with an electric heating element 26 and a pressure tight door 30. The rear end of this cylinder 25 is sealed by a convex head 27 having openings therethrough for an exhaust conduit 31, a thermostat 32 and electrical connectors 33 for the heating element 26.

The cylinders 25 is preferably formed of stainless steel or aluminum sheet, all seams being welded together. The space between the housing 31 and the cylinder 25 is substantially filled with insulating material 34. Mineral wool, fibre glass or other light weight insulating material of suitable characteristics have proved satisfactory. The forward end of the cylinder 25 is provided with a metal ring 36 of heavier metal having a beveled inner edge 37 which is welded to the cylinder 25. A second ring 38 for receiving the door 30 is welded to the first and extends forwardly thereof. The door receiving ring 38 is provided with four slots 40 for receiving the locking dogs 41 of the door 30. The inner end 27 of the cylinder 25 is supported by suitable brackets (not shown) and the outer end is secured by means of the rings 36 and 38 to the front plate 42 of the housing 31.

The door assembly 30 comprises a cover plate 44, having two handle supporting members 45 welded thereto which carry a pin 46 about which the handle 47 rotates, and a pressure plate 48 bolted to the cover plate 44. The pressure plate 48 closes the end of the cylinder when the door 30 is in place. A spacer ring 60, preferably cut from laminated plastic sheet material, separates the cover plate 44 from the pressure plate 48 and thereby provides a cavity 51 within the door 30 which contains the door locking mechanism. The bolts 53 extend through the cover plate 44 and the spacer rings 50 into blind tapped holes (not shown) in the pressure plate 48. The finger 59 on the handle 47 extends through the cover plate 44 and into this cavity 51 for operating a toggle plate 55 which is rotatably mounted on a pin 56 fixed in the pressure plate 48. The projection 59 extends into a hole 57 into the toggle plate 55, which hole is spaced from the axis of rotation of the plate 55. Thus rotation of the handle 47 about the pin will cause the finger 59 to move upwardly or downwardly causing the toggle plate 55 to rotate.

The toggle plate 55 is provided with four pins 58 which project outwardly and carry the inner ends of the dogs 41. The outer ends of the dogs extend through openings 60 provided in the spacer ring 50. By this arrangement, rotation of the toggle plate 55 causes the outer ends of the dogs 41 to protrude from or be retracted into the spacer ring 50. Thus when the handle 47 is moved downwardly, the cam plate is rotated in a counterclockwise direction causing the ends of the dogs to project from the spacer ring 50. If the door 30 is in a closed position these dogs 41 protrude from the door 30 into the corresponding slots 40 provided in the ring 38 and lock the door 30 closed. When the handle 47 is moved in the upward direction the toggle plate 55 is rotated in a clockwise direction withdrawing the dogs 41 from the slots and allowing the door to be opened. A spring 61 secured to the pressure plate 48 and the toggle plate 55 urges the toggle plate 55 to rotate in the counterclockwise direction with the dogs 41 extended.

The periphery 64 of the pressure plate 48 is provided with a radially inwardly extending V groove 63a and carries an elastomer sealing gasket ring 63. The one-piece gasket 63 is stretched and snapped around the groove 63a or may be held in place by a retaining ring (not shown) secured to the pressure plate. When the door 30 is closed this gasket 63 is squeezed between the beveled surface 37 on the ring 36 and the pressure plate 48 to form a hermetically sealed joint. A plurality of small holes 64a extend from the bottom of the groove 63a forwardly into the space 72. This space is open to the inside of the chamber 25 with the result that pressure within the chamber 25 is transmitted to the bottom of the groove 63a and forces the gasket 63 outwardly against the surface 37 to increase the efficiency of the seal.

In order to prevent opening the door 30 during the time when the cylinder 25 is subjected to pressure, a safety lock mechanism is provided. This locking mechanism comprises pressure sensitive bellows 65 mounted on the inner side of the pressure plate 48 and having a plunger 66 secured to the movable end thereof. This plunger 66 extends through the pressure plate 48 and is in alignment with a hole 67 provided in the toggle plate 55 when the door mechanism is in the locked position. When pressure is present in the cylinder, the bellows 65 is compressed, moving the end of the plunger 66 outwardly so that it projects into the hole 67 in the toggle plate 55 and locks the plate 55 against rotation. When the plunger 66 is inserted in the toggle plate 55, the dogs 41 cannot be withdrawn from the slots 40 and the door 30, therefore, cannot be opened as long as pressure is present in the cylinder 25. An adjusting screw 68 is provided in the inner end of the bellows 65 so that the pressure, at which the locking becomes effective, may be adjusted.

Although a bellows has been shown it is contemplated that a flexible diaphragm or differential piston arrangement could be substituted in the door locking mechanism.

The inner end of the door is formed of a disc 70 of light sheet metal which, together with a cylindrical skirt 71 mounted on the inner face of the pressure plate 48, forms an enclosure which is partially filled by the bellows 65 and otherwise filled with lightweight insulating material 72. A hole 73 is provided through this plate into the space surrounding the bellows 65 so that pressure within the cylinder 25 will act upon the bellows 65.

Two parallel supporting arms 75 and 76 which extend into the cooking chamber 25 are mounted on the inner side of the door 30. These arms 75 and 76 serve a dual function in that they support the door 30 during its insertion into the cylinder 25 and also serve to support the cooking utensil 77. Each arm 75 is formed preferably of two aluminum or stainless steel angle bars 75 and 76 welded or riveted together as illustrated (Fig. 7) to form a longitudinal slot 77 which slides over supports 80 fixed to the inner walls on the cylinder 25. A stop 81 is provided on the inner end of each arm 75 and bears against the end of the cooking utensil 77 to withdraw it when the door 30 is pulled out of the chamber 25.

The heating element 26 is mounted inside of the cylindrical chamber below the position of the inserted utensil 77 in order to achieve greater efficiency of heat transfer and reduce the heat losses through the insulation 34 to the room in which the unit 18 is being used. In Fig. 3 this element 26 is illustrated as a coil of resistance wire mounted in supports 83 of refractory insulating material, which are carried on the underside of a horizontal plate 84 disposed in the bottom of the cylinder 25. This plate 84 serves to prevent particles of food becoming lodged in the heating element 26 and burning. In some instances it has been found desirable to eliminate this plate 84 and use Calrod type heating elements or Nichrome coils on an insulating grid providing means for removing the entire unit for cleaning when required.

Figure 7:
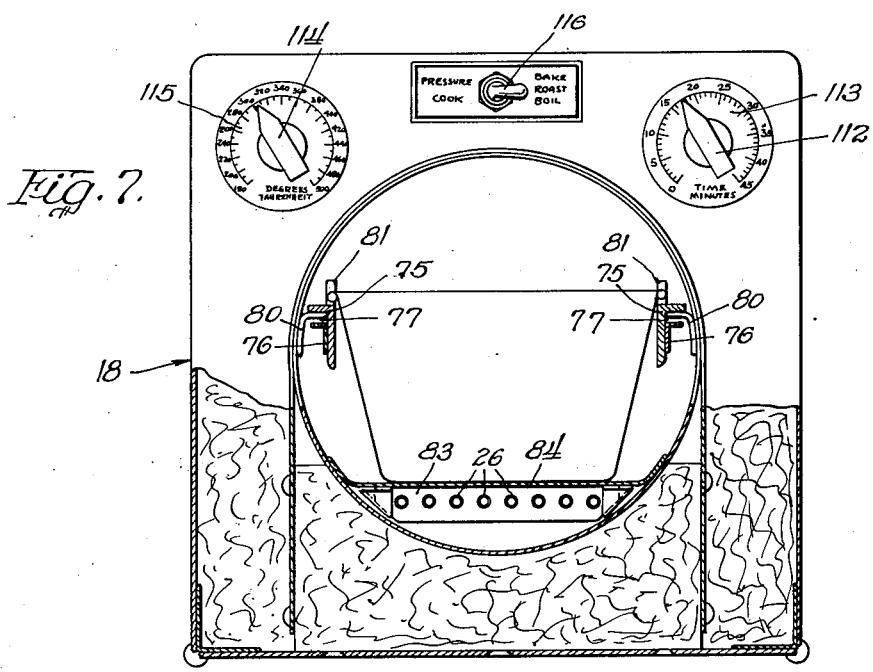
Fig. 7 is a partial sectional view showing the front of a cooking unit with the door removed.

The spacing between the supports 80 and the bottom plate 84 is such that the bottom of the utensil 77 will rest on the plate 80 rather than be suspended above it when the door 30 is inserted as shown in Fig. 7. By this means, radiant heat as well as convective is transferred directly from the glowing element 26 to the bottom surface of the plate 84 from which it travels by conduction into the food to be cooked or, when the plate 84 is eliminated, directly to food through the utensil. To further increase the efficiency of transfer the lower surface of the plate 84 is blackened and the bottom wall of the cylinder 24 is polished so that radiant heat is absorbed by the black surface and reflected by the polished surface.

The electrical connections to the heating element pass through the rear wall 27 of the cylinder 25 as indicated in Fig. 3. Ceramic insulators 33 are provided which are capable of withstanding a pressure of approximately 50 pounds per square inch to insulate the conductors 85 and 86 from the metal wall of the end plate 27.

A vertical wall 90 separates the main portion of the cooking unit from a cavity 89 at the rear end which houses the various control elements. A steam outlet conduit 31 extends from approximately the center of the convex end of the cylinder 25 through the vertical wall 90 into the exhaust chamber 92 formed in the cavity 89 containing the controls by separating walls 93 which serve to confine the steam to a limited area and keep it away from the various electric controls. The rear end of this chamber 92 opens into a filter element 99 whose other side is exposed to the atmosphere. The inner end of the conduit 31 terminates in a T 94, one leg of which extends upwardly and is faced off to form a valve port 95. This port 95 is closed by a hemispherical valve 96a supported in a member 96 to form a safety valve. A solenoid 97 is mounted outside the exhaust chamber 92 so that its plunger 98 extends downwardly through an opening in one wall of the exhaust chamber 92 and is supported on one end of a valve operating lever 100 which is rotatably mounted on a pin 101. The other end of this lever 100, which is forced upwardly by the weight of the plunger 98, supports the safety valve member 96 in a position above the valve port so that the port 95 is open when the solenoid 97 is not energized. When the solenoid 97 is energized, it is lifted off the lever 100 allowing the lever to rotate and drop the member 96 into the closed position. The valve 96a is formed as a bolt for ready replacement when worn or pitted and to provide an adjustment to remove lost motion between the arm 100 and the member 96.

The remainder of the space inside the rear compartment 89 not filled by the exhaust chamber 92 houses the various control elements as follows: A timer 103, a power relay 104, a control relay 105, a pressure actuated switch 107 and gears 108 and 109 for positioning the thermostat 32. The pressure actuated switch 107 is connected to the conduit 31 by the lower leg 111 of the tee. A shaft (not shown) extends from the forward side of the timer 103 to a knob 112 on the time set dial 113 on the front end of the unit 18. A similar shaft (not shown) extends rearwardly from the knob 114 of the pressure temperature dial 115 on the front of the unit 18 to the gear 109 which meshes with a second gear 108 whose shaft 116 extends forwardly into the thermostat 32 which is mounted in the rear wall 27 of the cylinder 25. Thus the thermostat 32 may be adjusted to any given temperature from the knob 114 on the front of the unit and similarly the timer 103 may be set for any time interval by rotating its knob 112 on the front. A single pole single throw switch 116 is provided on the front plate 42 of the unit 18 for the purpose of setting the controls for pressure cooking or ordinary cooking. The electrical connections between the various controls are preferably made through the moisture tight conduits 115 connecting the various elements.

A normally opened switch 117, preferably a microswitch, is mounted on the ring 38 so that its actuating plunger 118 extends into the slot 40. This switch 117 is located so that it is closed when the door 30 is locked in the closed position by the action of the lower dog 41.

The preferred electrical connections between the various control elements and the functional relationship between them can be best understood by reference to the wiring diagram of a single unit 18 shown in Fig. 5.

Electrical current is supplied to the line conductors 120 and 121 from a source of supply indicated at 122. The conductor 121, which may be grounded for purposes of safety, extends from the source 122 to the heating element 26. The other line conductor 120 connects one terminal 123 of a normally open switch 124 in the power relay 104 to the current source 122. Another conductor 125 connects the other side of the power relay switch 124 with the heating element 26. By this arrangement current is supplied to the heating element 26 during the time when the switch 124 is closed and not supplied when this switch is opened.

For the purpose of controlling the operation of this switch 124 in the relay 104, a timer 103, having a switch 103a incorporated therein, a thermostat 32 and a pressure actuated switch 107 are provided. One terminal 128 of the operating coil 127 in the relay 104 is connected to the line conductor 121 by a conductor 130. The other terminal 131 of this coil 128 is connected to the line conductor 120 through the thermostat 32, pressure switch 107 and timer switch 103a in series by a conductor 132. The thermostat 32 is of the conventional type having a switch which is normally closed at lower temperatures which opens when the preset higher temperature is reached. The pressure actuated switch 107 is similarly constructed so that it is normally closed, and opens only when a predetermined high pressure is reached. Thus the switch 103a, incorporated into the timer 103, is the on-off switch for the unit since the thermostat 32 and switch 107 are normally closed.

The timer 103 is the conventional electrically driven type having a constant speed electric motor as a driving element. When the knob 112 is turned away from the zero position on the dial 113 the switch 103a is closed. If current is then supplied to the motor of the timer 103 the knob 112 is driven in a counterclockwise direction at a rate of one graduation per minute until it reaches the zero position and opens the switch 103a stopping the supply of current to the various control elements.

Since cooking time should be measured from the time the cooking unit 18 arrives at the proper cooking temperature or pressure rather than the time the food is placed inside the unit 18, additional relays are employed to supply current to run the motor of the timer 103 only during the time the unit 18 is operating at the preset temperature or pressure. The power relay 104 contains a second switch 136 which is normally closed except when the relay 104 is energized during the periods current is being supplied to the heating element 26. A conductor 137 connects one terminal 138 of the switch 136 to a terminal 140 of the timer switch 103a. The other terminal 142 of the switch 136 is connected by the conductor 143 to the coil 145 in the control relay 105. The other end of this coil 145 is connected by means of the conductor 130 to the line conductor 121. The normally opened switch 148 of the relay 105 is connected by the conductor 137 to the terminal 140 of the timer switch. The other terminal of the switch 148 is connected to the driving motor of the timer 103 and to the terminal 142 of the switch 136 by the conductors 143 and 149. The other terminal of the timer motor is connected to the line conductor 121.

The operation of the above described elements is as follows: When food is placed inside the unit 18 to be cooked the temperature knob 114 and the timer knob 112 are set to the desired cooking temperature and cooking time. If it is not desired to pressure cook, the switch 107 is closed. When the timer knob 112 is turned away from the zero position the switch 103a is closed so that current flows through the thermostat 32 and pressure switch 107 to the coil 128 of the power relay 104, closing the switch 123 and opening the switch 136. Power is therefore supplied to the heating element 26, but since the switch 136 is opened current does not flow to the motor of the timer 103 through the conductor 143. The switch 148 in the control relay 105 is constructed so that it responds more slowly than the switch 124 in the power relay and, therefore, does not close at this time. As current flows through the element 26 the unit 18 heats up until it reaches the temperature at which the thermostat 32 has been set. At this time the thermostat switch 32 opens, stopping the flow of current to the coil 128. The switch 124 then opens, to cut the current supply to the element 26, and simultaneously the switch 142 closes. With this switch 142 closed, current flows through the conductors 137 and 132 to the coil 145 in the control relay 105, closing the switch 148 supplying driving current to the motor of the timer 103. The cooking unit 18 then cools down until the thermostat 32 closes, operating the relay 104 to close the switch 124 and open switch 136. However, when the switch 136 is opened the motor of the timer 103 continues to run, for current is supplied to the coil 145 of the relay 105 by a conductor 150 and the conductor 130 extending to the line conductor 121. Thus the timer 103 once started when the preset cooking temperature is reached the first time will continue to run until the zero position of the knob 112 is reached and the switch 103a opens. When pressure cooking, the thermostat 32 is set to a high temperature and the pressure switch 107 performs similar functions to actuate the relay 104.

Those portions of the circuit described above are all that are necessary for the unit 18 to operate as an ordinary cooker for automatic frying, baking, stewing, boiling, etc. In order to provide for automatic pressure cooking as well, two additional switches 116 and 117 and the valve operating solenoid 97 are added to the circuit. These three elements are connected in series between the terminal 140 of the timer switch 103a and the line conductor 121. When electric current is supplied to the solenoid 97 the safety valve member 96a is dropped into position to seal the outlet conduit 31. When the pressure cook switch 116 on the front of the unit 18 is closed and the door 30 is inserted and locked in the closed position, the dog 41 depressing the plunger 118 to close the switch 117, the solenoid 97 is energized while the timer switch 103a is closed. With the outlet 31 sealed, the unit 18 functions as a pressure cooker, the temperature and pressure inside the cylinder 25 rising until the pressure actuated switch 107 or thermostat 32 opens to stop the flow of current to the heating element 26. With the present embodiment the temperature knob 114 must be set at a temperature above the saturation temperature for steam at the pressure at which the switch 107 operates or the relay 104 may be actuated prematurely.

In the embodiment illustrated, variable pressure control is not achieved; however, it will be obvious to those skilled in the art that all that need be done to provide variable control is to replace the switch 107 with a variable pressurestat and provide another knob and dial on the front plate of the unit 18, the dial being inscribed with graduations of varying pressure and the knob being mechanically connected to the pressurestat.

In practice it has proved desirable to adjust the pressure switch 107 to open at a pressure between 10 and 20 p. s. i. and to adjust the safety valve 96 to open a pound or so higher. When this is done the cylinder 25 automatically vents itself of air when the pressure rises to the preset value and the switch 107 closes. The contents of the chamber 25 continue to be heated for a short time after the switch 107 opens causing the pressure to overshoot, opening the safety valve 96 and venting a mixture of air and steam to the atmosphere.

The cooking unit 18 illustrated in Fig. 3 is shown to have a filter 99 mounted adjacent the exhaust chamber 92. This filter is supported in an open metal frame 160 and comprises a gauze bag 161 filled with activated charcoal 162 contained within a metal screen frame 163.

When the unit 18 is to be installed with other units in a common housing, or to form a stove structure, it is contemplated that a manifold be employed connecting each separate exhaust chamber to a common filter. This filter can also be provided with a water bath through which the exhaust gases must pass to cool them and condense any steam as well as remove other volatile liquids. In some cases the filter may be eliminated and the bath used alone.

The oven unit 21 shown in Figs. 1 and 2 is practically identical, except in size and the fact that it has an extra heating element (not shown) at the top of the chamber, with the above described smaller unit 18. The addition of the extra heating element for broiling purposes has no effect on the wiring circuit except that a selector switch must be provided in the conductor 125 and another heating element connected to this switch and the line conduit 121. The selector switch makes it possible to use either or both heating elements at will.

From the foregoing description it will be apparent to those skilled in the art that this invention achieves many new results in the science of cooking and makes it possible to cook foods in a quicker, more accurate, and generally superior manner with the exercise of less care and skill on the part of the cook.

It will also be obvious that various changes and modifications may be made in the described embodiment without departing from the spirit of this invention whose scope is defined by the following claims.

What is claimed is:

1. In a pressure cooker having a pressure chamber, a pressure tight access door, means for locking said door in the closed position, a passageway connecting the interior of said chamber to the atmosphere, a valve member for closing said passageway, and an electrical circuit for controlling the operation of said valve, said circuit including a switch operated by the door locking means for preventing the opening of said valve unless said door is locked.

2. In a pressure cooker having a pressure chamber, a pressure tight access door, means for locking said door in the closed position including a retractable dog, an electrically actuated valve member for sealing said chamber, and means for controlling the position of said valve member, including a source of electric power and a switch actuated by said dog for controlling the supply of power from said source to said electrically actuated valve.

3. For use in a pressure cooker having an access opening and an exhaust passageway the combination including a closure, means for locking said closure in the opening, a solenoid actuated valve for sealing said passageway, and means including a switch actuated by the locking means for supplying current to said solenoid to close said valve.

4. In a pressure cooking apparatus the combination including a pressure chamber, a valve for sealing said chamber from the atmosphere, an access cover, means for locking said cover, a switch adapted to be closed by said locking means, a timer, a second switch adapted to be closed when said timer is turned away from zero, a solenoid adapted to close said valve when energized, said two switches being connected in series between said solenoid and a source of current whereby said valve is closed only when said cover is locked and said timer is turned away from zero.

CLARENCE N. CONE.

References Cited in the file of this patent

UNITED STATES PATENTS

| Number | Name | Date |
| --- | --- | --- |
| Re. 17,336 | McKenna | June 25, 1929 |
| 1,208,041 | Steere | Dec. 12, 1916 |
| 1,324,544 | Durgarian | Dec. 9, 1919 |
| 1,361,946 | Whitaker | Dec. 14, 1920 |
| 1,437,119 | Speck | Nov. 28, 1922 |
| 1,473,408 | Richardson et al. | Nov. 6, 1923 |
| 1,501,412 | Ingram | July 15, 1924 |
| 1,585,372 | Burnham | May 18, 1926 |
| 1,597,187 | Garman | Aug. 24, 1926 |
| 1,604,062 | Miller | Oct. 19, 1926 |
| 1,650,579 | McBride | Nov. 22, 1927 |
| 1,858,013 | Heins | May 10, 1932 |
| 1,910,682 | Dumas | May 23, 1933 |
| 1,946,220 | Lotz | Feb. 6, 1934 |
| 1,994,629 | Arkema | Mar. 19, 1935 |
| 2,026,596 | Ross | Jan. 7, 1936 |
| 2,194,117 | Graham | Mar. 19, 1940 |
| 2,194,118 | Graham | Mar. 19, 1940 |
| 2,310,044 | Stevenson | Feb. 2, 1943 |
| 2,339,974 | Austen | Jan. 25, 1944 |
| 2,360,321 | Griswold | Oct. 17, 1944 |
| 2,369,932 | Allen | Feb. 20, 1945 |
| 2,400,303 | Guinn | May 14, 1946 |
| 2,422,974 | Newell | June 24, 1947 |
| 2,458,461 | Young et al. | Jan. 4, 1949 |
| 2,472,451 | Whitney | June 7, 1949 |
| 2,481,341 | Pledger | Sept. 6, 1949 |
| 2,483,628 | Davis | Oct. 4, 1949 |
| 2,496,883 | McKalip | Feb. 7, 1950 |
| 2,515,879 | Korn | July 18, 1950 |
| 2,535,863 | Pledger | Dec. 26, 1950 |

FOREIGN PATENTS

| Number | Country | Date |
| --- | --- | --- |
| 33,658 | Germany | Nov. 9, 1885 |
| 510,608 | Great Britain | Aug. 3, 1939 |